(No Model.) 2 Sheets—Sheet 1.

G. WESTINGHOUSE, Jr.
CONNECTION FOR PIPE LINES.

No. 313,393. Patented Mar. 3, 1885.

Witnesses:

Inventor.
George Westinghouse Jr
by George H. Christy
Att'y

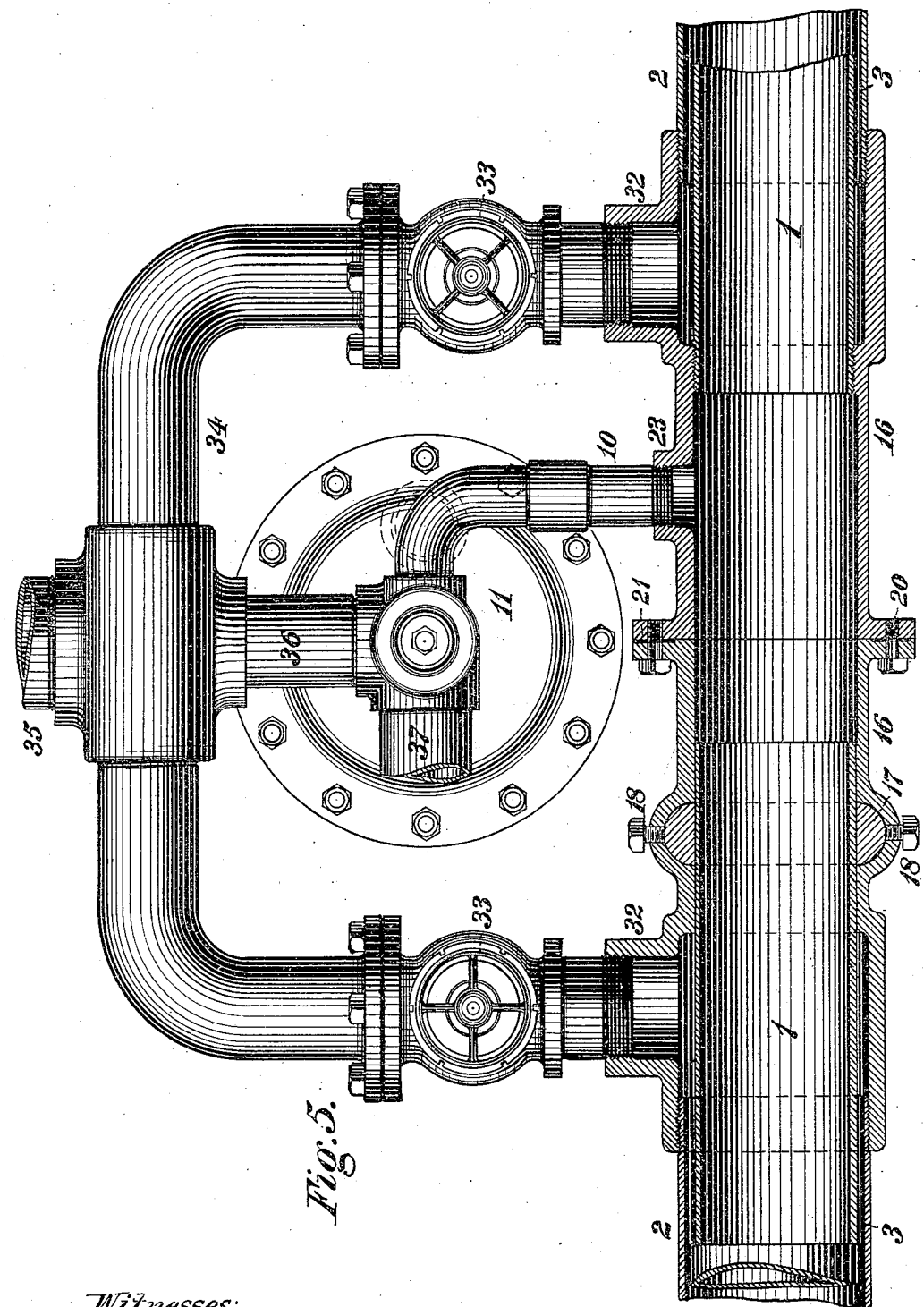

UNITED STATES PATENT OFFICE.

GEORGE WESTINGHOUSE, JR., OF PITTSBURG, PENNSYLVANIA.

CONNECTION FOR PIPE-LINES.

SPECIFICATION forming part of Letters Patent No. 313,393, dated March 3, 1885.

Application filed July 1, 1884. (No model.)

*To all whom it may concern:*

Be it known that I, GEORGE WESTINGHOUSE, Jr., a citizen of the United States, residing at Pittsburg, in the county of Allegheny and State of Pennsylvania, have invented or discovered certain new and useful Improvements in Pipe-Lines, of which improvements the following is a specification.

Figure 1:
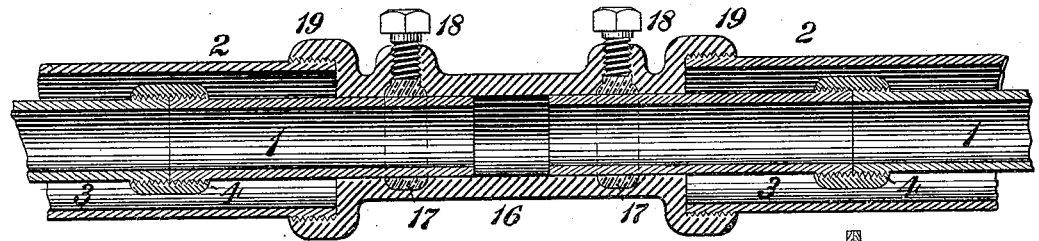
Figure 2:
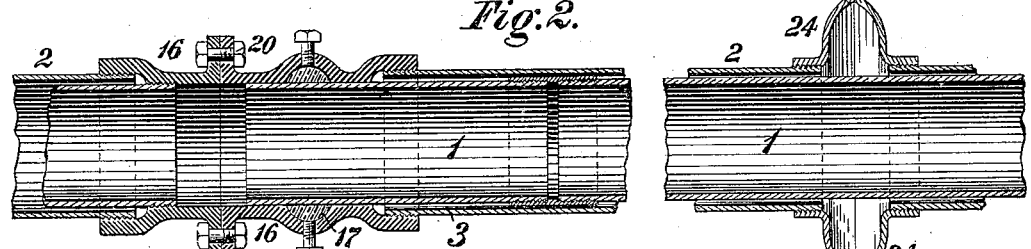
Figure 3:
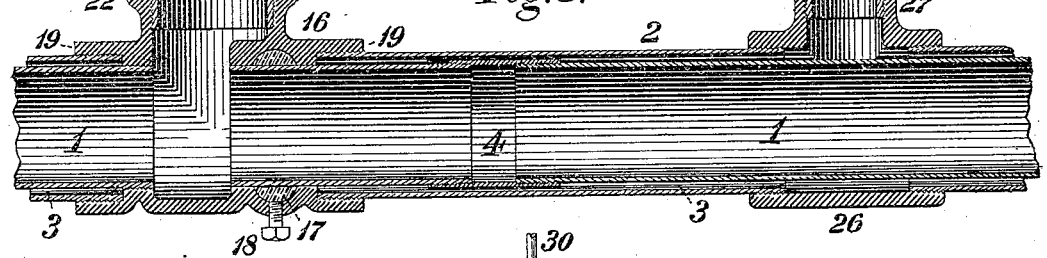
Figure 4:
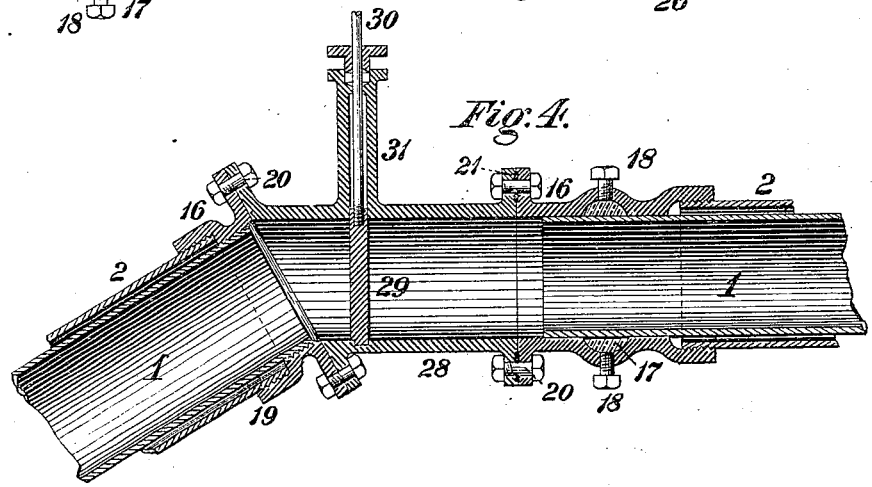

In the accompanying drawings, which make part of this specification, Figure 1, Sheet 1, is a longitudinal central section through a portion of a pipe-line, illustrating an application of my invention; Fig. 2, a similar section illustrating provision for the independent expansion and contraction of the inner and outer series of pipes; Fig. 3, a similar section showing means for connecting branch lines and outlets; Fig. 4, a similar section showing provision for changes in the direction of the line and regulating the flow through the main conduit; and Fig. 5, Sheet 2, a similar section showing provision for delivery-outlets from the inner and from different compartments of the outer series of pipes and for effecting communication between the compartments of the casing.

In an application for Letters Patent filed by me June 6, 1884, Serial No. 133,999, I have illustrated and described a system of conveying and utilizing gas under pressure, in which gas of comparatively high pressure is conveyed through a main or inner conduit or line of pipe which is inclosed within an outer casing or line of pipe, forming a series of compartments adapted to be continuously charged with gas of low pressure and to receive leakage, if any, from the inner line, delivery of gas being made at desired points from the casing or outer line.

The object of my present invention is to provide proper and desirable means for connecting the sections of the inner and outer lines in such manner as to enable contraction and expansion thereof under variations of temperature to be suitably provided for, and the connection of delivery-pipes and branch lines to be readily effected at different points, as may be required.

The improvements claimed are hereinafter fully set forth.

Referring to the drawings, the inner or main conduit, 1, through which the higher pressure gas passes, is formed of a series of sections of pipes of proper strength, connected one to another by couplings 4, of any suitable construction, and is inclosed by an outer casing, 2, composed of sections of pipe of larger diameter, forming chambers or compartments 3, of annular transverse section around the main conduit 1, for the reception of gas at a lower pressure than that of the gas in the main conduit. The sections of the outer casing are connected at desired points in the line by tubular couplings or connections 16, which are located at proper distances apart to institute such limits of the length and capacity of the compartments 3 as convenience of construction, and repair of the line, and the requirements of the supply service may render advisable. The couplings 16 are tightly secured at each of their ends by internally-threaded sockets 19, or otherwise, to the adjacent casing-sections 2, so as to form the heads or end boundaries of the compartments included between said sections and the main conduit 1, and are preferably divided longitudinally into two sections united by bolts 20 and nuts, as shown in Figs. 2, 4, and 5, to admit of the ready removal and replacement of portions of the line, as may from time to time be required, without disturbing other portions. The joints between the coupling-sections can be packed by rings or gaskets 21, of copper or other suitable material, which are compressed tightly between the abutting faces of the sections by the connecting-bolts 20. Lateral nozzles or sockets 22 may be formed upon the couplings for the attachment of branch lines of main conduits and their casings, as shown in Fig. 2, and they may also be provided with supply-nozzles 23, Fig. 5, for the connection of supply-pipes 10, opening into the main conduit 1, and delivering high-pressure gas therefrom to pressure-regulators 11, or to other desired points of supply. The couplings 16 are bored out truly at points adjacent to one or both of their ends, to receive the correspondingly-turned ends of the adjacent sections of the main conduit 1, which fit tightly within the couplings, so as to prevent communication with the compartments 3, and have the capacity of longitudinal movement relatively to the couplings, to admit of expansion and contraction resultant upon variations of temperature. In the construction shown in Fig. 1 such longitudinal movement of the main-conduit sections is provided for at both ends of the couplings, and in the remaining figures the conduit-sections are shown as secured to the couplings toward one end thereof, and the sections communicating with opposite ends are movable relatively thereto, expansion and contraction of the main line being thus permitted in either case.

In order to insure proper tight joints between the conduit-sections and the couplings, packing 17, of lead or other suitable material, is inserted in internal recesses in the couplings surrounding the conduit-sections 1, and is compressed to the requisite degree of tightness on the sections by packing-screws 18, engaging threads in the shell of the couplings.

The independent expansion and contraction of the casing-sections 2 is provided for by connecting thereto at one or more points in the length of each compartment 3 expansion-joints formed of two bowl-formed or dished plates, 24, of flexible metal, secured at their centers to the ends of two adjacent sections of the casing, which sections are separated one from the other by an intervening space, and are united by the expansion-plates 24, which abut at their peripheries, adjacent to which they are connected by bolts 25 and nuts, or by rivets, suitable packing being interposed, if desired, to insure tight joints. The elasticity of the plates 24 enables expansion and contraction of the casing to be accommodated by independent longitudinal movement of the sections on each side of the expansion-joint without in any wise inducing liability to leakage thereat. The expansion-joints are located at such distance apart in the casing as will admit of their function being properly effected, and their provision has the further advantage of enabling portions of the casing to be readily and conveniently removed and replaced, as may become necessary or desirable.

Couplings 26, having side nozzles, 27, for the connection of supply-pipes 38, for conveying gas to or from the compartments 3, may be employed for the connection of the casing-sections 2 at desired points, and these, as well as the couplings 16, may be inclosed in casings or boxes, so as to be conveniently accessible for examination, renewal, or repair.

Fig. 4 shows a coupling provided with a supplemental section, 28, having one of its ends perpendicular to and the other inclined at an angle with its axis, said supplemental section being interposed between and secured by bolts passing through end flanges to the two sections of a coupling, 16, such as above described.

By the employment of supplemental sections having one or both of their end faces properly inclined, the direction of the line may be varied to a greater or less degree, either vertically or horizontally, as required at different points, and the main coupling-sections are equally adaptable to use when connected directly, as in a straight line, or intermediately by the supplemental sections, at bends or inclinations of the line.

Gate or open-way valves 29, operated by stems 30, and working in valve-casings 31, may be fitted to the couplings 16, said valves serving to regulate or entirely shut off the flow of gas through the main conduit 1.

A valve 29 may be applied either in one of the sections of a coupling 16, or in a supplemental section adapted to be connected thereto, and in this instance is shown as fitted to the supplemental section 28, above described.

The construction illustrated in Fig. 5 embodies means for establishing communication between two of the compartments 3, and affording a conjoined delivery-supply therefrom, as well as a direct supply at reduced pressure from the main conduit 1. To this end a lateral supply-nozzle, 32, communicating with the adjacent casing-compartment 3, is formed upon each section of the coupling 16, and a stop-valve, 33, is connected to each of said nozzles. The delivery-openings of the stop-valves 33 are connected by a pipe, 34, which serves to establish an equilibrium of pressure in the compartments 3 on each side of the coupling, and a low-pressure supply-pipe, 35, leads from the equilibrium-pipe 34 to a point or points of delivery. The equilibrium-pipe may be also connected by a branch, 36, with a pressure-regulator, 11, to which gas is supplied from the main conduit 1 by a pipe, 10, and from which a supply at lower pressure is delivered through a pipe, 37, or through the pipe 36.

I claim herein as my invention—

1. The combination of a main conduit or line of pipe, an outer casing surrounding said conduit, and a coupling secured at each of its ends to a section of the outer casing, and forming a closed end or head thereon, and fitting closely around two adjacent sections of the main conduit, substantially as set forth.

2. The combination of an outer casing or line of pipe, couplings secured at their ends to sections of said casing and forming independent chambers or compartments therein, and a main conduit or inner line of pipe, formed in detached sections fitting closely at each of their ends in said couplings, and one at least of said sections having the capacity of longitudinal movement relatively thereto, substantially as set forth.

3. The combination of an outer casing or line of pipe, a tubular coupling secured at its ends to two adjacent sections of said casing, a main conduit or inner line of pipe, two adjacent and detached sections of which fit closely at their ends within said coupling, with the capacity of longitudinal movement of at least one of said sections relatively to the coupling, and packing interposed between the movable section or conduit and the body of the coupling, substantially as set forth.

4. The combination of an outer casing or line of pipe, a tubular coupling connected at its ends to adjacent sections of said casing, a main conduit or inner line of pipe having detached sections fitting closely in said coupling, packing interposed between said conduit and said coupling, and a compressing screw or screws engaging the body of the coupling and bearing on said packing, substantially as set forth.

5. The combination of an outer casing or line of pipe, a tubular coupling connected at its ends to adjacent sections of said casing, an expansion-joint composed of two dish or bowl formed plates, secured together adjacent to their peripheries, and connected toward their centers to two adjacent and detached sections of the casing, and a main conduit or inner line of pipe formed in detached sections fitting closely in each end of the coupling, with the capacity of longitudinal movement relatively thereto, substantially as set forth.

6. The combination of an outer casing or line of pipe, a tubular coupling secured at its ends to two adjacent sections of said casing, a main conduit or inner line of pipe having detached sections fitting closely in said coupling, a branch conduit communicating with the coupling, and connected to a lateral socket or nozzle thereon, and an outer casing surrounding said branch conduit, and secured to and having one of its ends closed by said lateral socket or nozzle, substantially as set forth.

7. The combination of a main conduit or line of pipe, an outer casing surrounding said conduit, and a coupling connecting two detached sections of said casing and having a lateral socket or nozzle for the attachment of a pipe communicating therewith, substantially as set forth.

8. The combination of an outer casing or line of pipe, a tubular coupling divided transversely into two main sections, each secured to a section of said outer casing, a main conduit or inner line of pipe having detached sections fitting closely within the main sections of the coupling, and a supplemental coupling-section having one or both of its ends inclined relatively to its axis, and adapted to be interposed between and secured to the main sections of the coupling, substantially as set forth.

9. The combination of a tubular coupling formed of two main sections, each fitted to receive the ends of an inner and an outer line of pipe, and a supplemental section fitted with a gate or open-way valve, and connected at its ends to the main sections of the coupling, substantially as set forth.

10. The combination of an outer casing or line of pipe, a tubular coupling secured at its ends to two adjacent sections of the casing and closing the ends thereof, a main conduit or inner line of pipe having detached sections fitting closely in the coupling and communicating with the bore thereof, and a lateral socket or nozzle formed upon the coupling, and affording attachment for a pipe communicating with the main conduit or inner line of pipe, substantially as set forth.

11. The combination of an outer casing or line of pipe, a tubular coupling secured at its ends to two adjacent sections of the casing and closing the ends thereof, a main conduit or inner line of pipe fitting closely in the coupling, and a lateral socket or nozzle formed upon the coupling and affording attachment for a pipe communicating with a section of the outer casing, substantially as set forth.

12. The combination of an outer casing or line of pipe, a tubular coupling secured at its ends to two adjacent sections of the casing and closing the ends thereof, a main conduit or inner line of pipe fitting closely in the coupling, and an equilibrium-pipe connected to the coupling and establishing communication between the sections of the casing on each end thereof, substantially as set forth.

13. The combination of an outer casing or line of pipe, a tubular coupling secured at its ends to two adjacent sections of the casing and closing the ends thereof, a main conduit or inner line of pipe fitting closely in the coupling, an equilibrium-pipe connected to the coupling and establishing communication between the sections of the casing on each end thereof, a delivery-pipe communicating with said equilibrium-pipe, and valves or cocks connected to each end of the equilibrium-pipes, each of said valves controlling communication between the equilibrium-pipe and the adjacent casing-section, substantially as set forth.

In testimony whereof I have hereunto set my hand.

GEO. WESTINGHOUSE, JR.

Witnesses:
J. SNOWDEN BELL,
R. H. WHITTLESEY.